(12) United States Patent
Agarwal et al.

(10) Patent No.: US 12,521,094 B2
(45) Date of Patent: Jan. 13, 2026

(54) SYSTEMS, METHODS, AND APPARATUSES FOR ANNOTATING MEDICAL IMAGES

(71) Applicant: KONINKLIJKE PHILIPS N.V., Eindhoven (NL)

(72) Inventors: Anup Agarwal, Mill Creek, WA (US); Shannon Renee Fox, Everett, WA (US); Conner David Pitts, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 27 days.

(21) Appl. No.: 18/574,129

(22) PCT Filed: Jun. 10, 2022

(86) PCT No.: PCT/EP2022/065808
§ 371 (c)(1),
(2) Date: Dec. 26, 2023

(87) PCT Pub. No.: WO2023/274682
PCT Pub. Date: Jan. 5, 2023

(65) Prior Publication Data
US 2024/0285255 A1    Aug. 29, 2024

Related U.S. Application Data

(60) Provisional application No. 63/215,632, filed on Jun. 28, 2021.

(51) Int. Cl.
*A61B 8/00* (2006.01)
*G06T 7/00* (2017.01)

(52) U.S. Cl.
CPC .......... *A61B 8/468* (2013.01); *A61B 8/4245* (2013.01); *A61B 8/465* (2013.01); *A61B 8/5223* (2013.01); *G06T 7/0012* (2013.01); *G06T 2207/10132* (2013.01); *G06T 2207/20081* (2013.01); *G06T 2207/20084* (2013.01)

(58) Field of Classification Search
CPC ......... A61B 8/465; A61B 8/467; A61B 8/468; A61B 8/52–5223
See application file for complete search history.

(56) References Cited

U.S. PATENT DOCUMENTS

| | | |
|---|---|---|
| 2008/0154123 A1 | 6/2008 | Jackson et al. |
| 2011/0208052 A1 | 8/2011 | Entrekin |
| 2012/0238875 A1 | 9/2012 | Savitsky et al. |
| 2013/0184584 A1* | 7/2013 | Berkey ............... A61B 8/5292 600/441 |
| 2017/0258445 A1 | 9/2017 | Van Alphen et al. |
| 2017/0303898 A1 | 10/2017 | Jackson et al. |

(Continued)

FOREIGN PATENT DOCUMENTS

WO    2021099214 A1    5/2021

OTHER PUBLICATIONS

International Search Report and Written Opinion for PCT/EP2022/065808; Mailing date: Sep. 29, 2022, 10 pages.

*Primary Examiner* — Carolyn A Pehlke

(57) ABSTRACT

An ultrasound imaging system may analyze acquired images, location and orientation of an ultrasound probe, and usage data to provide suggested annotations for the acquired images. The annotations may have various forms, such as text and bodymarker icons.

19 Claims, 11 Drawing Sheets

(56) References Cited

U.S. PATENT DOCUMENTS

2018/0008232 A1  1/2018  Mine et al.
2019/0336101 A1  11/2019  Chiang et al.
2021/0030392 A1*  2/2021  Dmitrieva .............. A61B 8/463
2022/0296219 A1*  9/2022  Aladahalli ............. A61B 8/469

* cited by examiner

SYSTEMS, METHODS, AND APPARATUSES FOR ANNOTATING MEDICAL IMAGES

CROSS-REFERENCE TO PRIOR APPLICATIONS

This application is the U.S. National Phase application under 35 U.S.C. § 371 of International Application No. PCT/EP2022/065808, filed on Jun. 10, 2022, which claims the benefit of U.S. Provisional Patent Application 63/215,632, filed on Jun. 28, 2021. These applications are hereby incorporated by reference herein.

TECHNICAL FIELD

The present disclosure pertains to imaging systems and methods for automatically or semi-automatically annotating medical images. In particular, imaging systems and methods for automatically or semi-automatically generating annotations for ultrasound images are disclosed.

BACKGROUND

During a typical ultrasound exam, a user (e.g., sonographer) may acquire multiple images of anatomy of interest in various imaging modes and orientations. For example, for a typical liver ultrasound exam in North America, the user will acquire multiple images of the liver, kidney, gall bladder, etc. for review by a physician at the same or a later time. To assist in the reading of the ultrasound images as well as for archival purposes, the images are annotated by the sonographer to inform the viewer of the specifics of the scan. In a typical workflow, the sonographer scans with the ultrasound probe until the desired image plane is achieved. The sonographer then "freezes" the image at the desired image plane. The user makes desired annotations on the frozen image. Annotations may include, amongst other things, text labels, bodymarker icons, and/or measurements. Once the user is satisfied, the annotated image is "acquired." That is, the image is stored (saved) in a computer readable memory of the ultrasound imaging system and/or provided to a picture archiving computer system (PACS).

FIG. 1 is an example of a display from an ultrasound imaging system including annotations on an ultrasound image. Display 100 includes an ultrasound image 102 of the liver and annotations 104 and 106. Label 104 is a text annotation that provides information on the anatomy in the ultrasound image 102, a region of the anatomy, and the imaging plane. In the example shown in FIG. 1, label 104 indicates the image is of the sagittal (SAG) plane of the left (LT) portion of the liver. Bodymarker 106 is an annotation that provides a graphical depiction of the portion of a subject's body 108 and an icon indicating a location and orientation of an ultrasound probe 110 relative to the body 108. In the example shown in FIG. 1, bodymarker 106 includes a graphic of a torso and an ultrasound probe placed near the top of the torso with the beam steered toward the navel. While the ultrasound image 102 may include both labels 104 and bodymarker 106 annotations as shown in FIG. 1, currently, labels 104 are more commonly used in North America while bodymarkers 106 are more commonly used in Europe and Asia.

Users manually type in labels and/or select labels from a pre-loaded list (e.g., by navigating one or more drop down menus). For body markers, users select the appropriate graphic for the bodymarker from a menu and manually place the icon indicating the location and orientation of the ultrasound probe on the graphic (e.g., using selection buttons along with arrow keys and/or track ball). Both types of annotations require significant time from the user, particularly when many images must be acquired and annotated. For example, a typical abdominal exam requires 40-50 images.

Some ultrasound imaging systems offer a "smart exam" feature that automatically annotates ultrasound images with labels, bodymarkers, and/or other annotations. However, "smart exams" typically require users to acquire images in a particular order and may not accommodate all of the images the user wishes to acquire for an exam. Accordingly, improved techniques for reducing the time to annotate ultrasound images is desired.

SUMMARY

Significant time is spend by imaging system users assigning annotations to ultrasound images, such as labels and bodymarkers. Systems, methods, and apparatuses to automatically or semi-automatically apply the labels and/or bodymarkers as the user acquires various images are disclosed. This can result in significant time savings for the user and be tailored to their experience.

According to at least one example of the present disclosure, an ultrasound imaging system may be configured to annotate ultrasound images and may include an ultrasound probe configured to acquire an ultrasound image, a non-transitory computer readable medium encoded with instructions and configured to store the ultrasound image, and at least one processor in communication with the non-transitory computer readable medium and configured to execute the instructions, wherein when executed, the instructions cause the ultrasound imaging system to determine an anatomical feature present in the ultrasound image, determine at least one of an imaging plane, a location of the ultrasound probe, or an orientation of the ultrasound probe, determine an annotation to apply to the ultrasound image based, at least in part, on the determined anatomical feature and the at least one of the determined imaging plane, the determined location of the ultrasound probe, or the determined orientation of the ultrasound probe, and provide the ultrasound image and the annotation to the non-transitory computer readable medium for storage.

According to at least one example of the present disclosure, a method for annotating ultrasound images may include receiving an ultrasound image acquired by an ultrasound probe, determining, with at least one processor, an anatomical feature present in the ultrasound image, determining, with the at least one processor, at least one of an imaging plane, a location of the ultrasound probe, or an orientation of the ultrasound probe, determining, with the at least one processor, an annotation to apply to the ultrasound image based, at least in part, on the determined anatomical feature and the at least one of the determined imaging plane, the determined location of the ultrasound probe, or the determined orientation of the ultrasound probe, and providing the ultrasound image and the annotation to at least one of a display or a non-transitory computer readable medium for storage.

DETAILED DESCRIPTION

The following description of certain embodiments is merely exemplary in nature and is in no way intended to limit the invention or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed apparatuses, systems and methods, and it is to be understood that other embodiments may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present apparatuses, systems, and methods. The following detailed description is therefore not to be taken in a limiting sense, and the scope of the present system is defined only by the appended claims.

According to examples of the present disclosure, an ultrasound imaging system may automatically annotate (e.g., apply annotations to) ultrasound images based on one or more sources of information: anatomical features identified in the ultrasound images, previously used annotations, previously acquired ultrasound images, usage data, and/or ultrasound probe tracking data.

Figure 1:
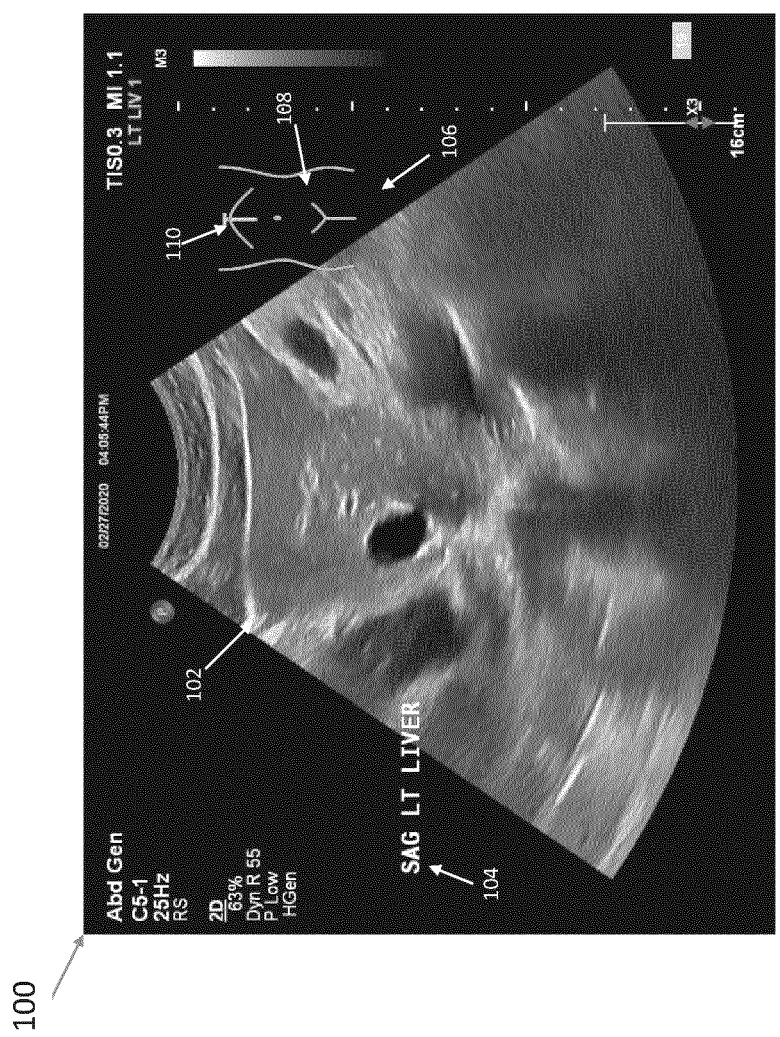
FIG. 1 is an example of a display from an ultrasound imaging system including annotations on an ultrasound image.
Figure 2:
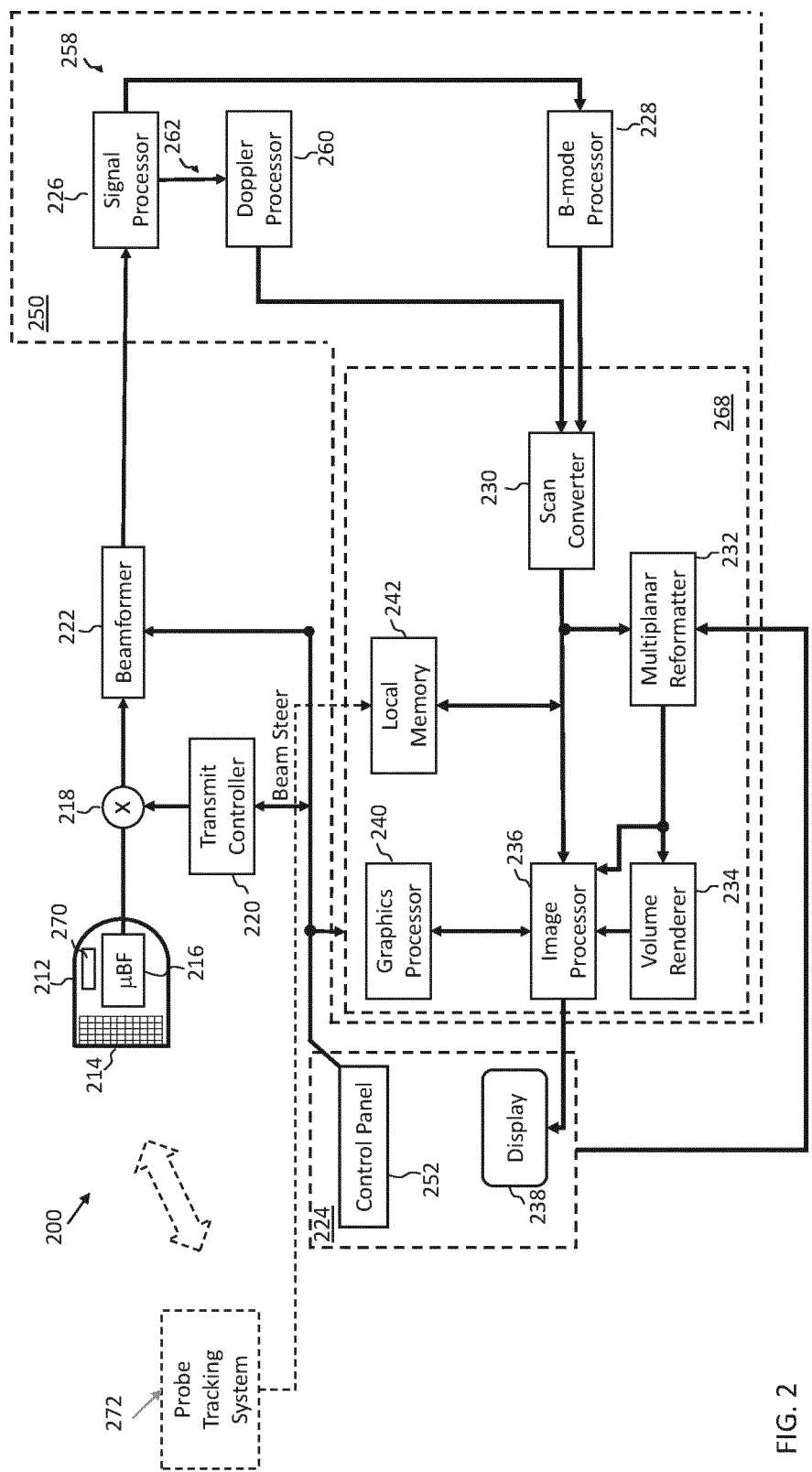
FIG. 2 is a block diagram of an ultrasound system in accordance with principles of the present disclosure.

FIG. 2 shows a block diagram of an ultrasound imaging system 200 constructed in accordance with the principles of the present disclosure. An ultrasound imaging system 200 according to the present disclosure may include a transducer array 214, which may be included in an ultrasound probe 212, for example an external probe or an internal probe such as a transvaginal ultrasound (TVUS) probe or a transesophageal echocardiography (TEE) probe. The transducer array 214 is configured to transmit ultrasound signals (e.g., beams, waves) and receive echoes responsive to the ultrasound signals. A variety of transducer arrays may be used, e.g., linear arrays, curved arrays, or phased arrays. The transducer array 214, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

Optionally, in some examples, the ultrasound probe 212 may include a tracking device 270. In some examples, the tracking device 270 may include an inertial measurement unit (IMU). The IMU may include an accelerometer, a gyroscope, a magnetometer, and/or a combination thereof. The IMU may provide data relating to the velocity, acceleration, rotation, angular rate, and/or orientation of the probe 212. In some examples, the tracking device 270 may further or alternatively include an electromagnetic tracking device. The electromagnetic tracking device may provide location and/or orientation information of the probe 212 independently and/or may operate in conjunction with a probe tracking system 272. The probe tracking system 272 may transmit and/or receive signals from the electromagnetic tracking device 270 and provide information on the probe's 212 location and/or orientation to the ultrasound imaging system 200, for example, to local memory 242. An example of a suitable probe tracking system 272 is the PercuNav System by Philips Healthcare, but other tracking systems may be used in other examples. Data associated with the velocity, acceleration, rotation, angular rate, location, and/or orientation of the probe 212 provided by the tracking device 270 may be collectively referred to as probe tracking data.

In some embodiments, the transducer array 214 may be coupled to a microbeamformer 116, which may be located in the ultrasound probe 212, and which may control the transmission and reception of signals by the transducer elements in the array 214. In some embodiments, the microbeamformer 216 may control the transmission and reception of signals by active elements in the array 214 (e.g., an active subset of elements of the array that define the active aperture at any given time).

In some embodiments, the microbeamformer 216 may be coupled, e.g., by a probe cable or wirelessly, to a transmit/receive (T/R) switch 218, which switches between transmission and reception and protects the main beamformer 222 from high energy transmit signals. In some embodiments, for example in portable ultrasound systems, the T/R switch 218 and other elements in the system can be included in the ultrasound probe 212 rather than in the ultrasound system base, which may house the image processing electronics. An ultrasound system base typically includes software and hardware components including circuitry for signal processing and image data generation as well as executable instructions for providing a user interface (e.g., processing circuitry 250 and user interface 224).

The transmission of ultrasonic signals from the transducer array 214 under control of the microbeamformer 216 is directed by the transmit controller 220, which may be coupled to the T/R switch 218 and a main beamformer 222. The transmit controller 220 may control the direction in which beams are steered. Beams may be steered straight ahead from (orthogonal to) the transducer array 214, or at different angles for a wider field of view. The transmit controller 220 may also be coupled to a user interface 224 and receive input from the user's operation of a user control. The user interface 224 may include one or more input devices such as a control panel 252, which may include one or more mechanical controls (e.g., buttons, encoders, etc.), touch sensitive controls (e.g., a trackpad, a touchscreen, or the like), and/or other known input devices.

In some embodiments, the partially beamformed signals produced by the microbeamformer 216 may be coupled to a main beamformer 222 where partially beamformed signals from individual patches of transducer elements may be combined into a fully beamformed signal. In some embodiments, microbeamformer 216 is omitted, and the transducer array 214 is under the control of the main beamformer 222 which performs all beamforming of signals. In embodiments with and without the microbeamformer 216, the beamformed signals of the main beamformer 222 are coupled to processing circuitry 250, which may include one or more processors (e.g., a signal processor 226, a B-mode processor 228, a Doppler processor 260, and one or more image generation and processing components 268) configured to produce an ultrasound image from the beamformed signals (e.g., beamformed RF data).

The signal processor 226 may be configured to process the received beamformed RF data in various ways, such as bandpass filtering, decimation, I and Q component separation, and harmonic signal separation. The signal processor 226 may also perform additional signal enhancement such as speckle reduction, signal compounding, and noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 258 which couples the signals from the signal processor 226 to a B-mode processor 228 for producing B-mode image data.

The B-mode processor can employ amplitude detection for the imaging of structures in the body. The signals produced by the B-mode processor 228 may be coupled to a scan converter 230 and/or a multiplanar reformatter 232. The scan converter 230 may be configured to arrange the echo signals from the spatial relationship in which they were received to a desired image format. For instance, the scan converter 230 may arrange the echo signal into a two dimensional (2D) sector-shaped format, or a pyramidal or otherwise shaped three dimensional (3D) format. The multiplanar reformatter 232 can convert echoes which are received from points in a common plane in a volumetric region of the body into an ultrasonic image (e.g., a B-mode image) of that plane, for example as described in U.S. Pat. No. 6,443,896 (Detmer). The scan converter 230 and multiplanar reformatter 232 may be implemented as one or more processors in some embodiments.

A volume renderer 234 may generate an image (also referred to as a projection, render, or rendering) of the 3D dataset as viewed from a given reference point, e.g., as described in U.S. Pat. No. 6,530,885 (Entrekin et al.). The volume renderer 234 may be implemented as one or more processors in some embodiments. The volume renderer 234 may generate a render, such as a positive render or a negative render, by any known or future known technique such as surface rendering and maximum intensity rendering.

In some embodiments, the system may include a Doppler signal path 262 which couples the output from the signal processor 226 to a Doppler processor 260. The Doppler processor 260 may be configured to estimate the Doppler shift and generate Doppler image data. The Doppler image data may include color data which is then overlaid with B-mode (i.e. grayscale) image data for display. The Doppler processor 260 may be configured to filter out unwanted signals (i.e., noise or clutter associated with non-moving tissue), for example using a wall filter. The Doppler processor 260 may be further configured to estimate velocity and power in accordance with known techniques. For example, the Doppler processor may include a Doppler estimator such as an auto-correlator, in which velocity (Doppler frequency, spectral Doppler) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators. In some embodiments, the velocity and/or power estimates may undergo further threshold detection to further reduce noise, as well as segmentation and post-processing such as filling and smoothing. The velocity and/or power estimates may then be mapped to a desired range of display colors in accordance with a color map. The color data, also referred to as Doppler image data, may then be coupled to the scan converter 230, where the Doppler image data may be converted to the desired image format and overlaid on the B-mode image of the tissue structure to form a color Doppler or a power Doppler image. In some examples, the power estimates (e.g., the lag-0 autocorrelation information) may be used to mask or segment flow in the color Doppler (e.g., velocity estimates) before overlaying the color Doppler image onto the B-mode image.

Outputs from the scan converter 230, the multiplanar reformatter 232, and/or the volume renderer 234 may be coupled to an image processor 236 for further enhancement, buffering and temporary storage before being displayed on an image display 238. A graphics processor 240 may generate graphic overlays for display with the images. These graphic overlays can contain, e.g., standard identifying information such as patient name, date and time of the image, imaging parameters, and the like. For these purposes the graphics processor 240 may be configured to receive input from the user interface 224, such as a typed patient name or other annotations (e.g., labels, bodymarkers). The user interface 224 can also be coupled to the multiplanar reformatter 232 for selection and control of a display of multiple multiplanar reformatted (MPR) images.

The system 200 may include local memory 242. Local memory 242 may be implemented as any suitable non-transitory computer readable medium (e.g., flash drive, disk drive). Local memory 242 may store data generated by the system 200 including ultrasound images, executable instructions, imaging parameters, log files including usage data, training data sets, or any other information necessary for the operation of the system 200. In some examples, local memory 242 may include multiple memories, which may be the same or of different type. For example, local memory 242 may include a dynamic random access memory (DRAM) and a flash memory.

As mentioned previously system 200 includes user interface 224. User interface 224 may include display 238 and control panel 252. The display 238 may include a display device implemented using a variety of known display technologies, such as LCD, LED, OLED, or plasma display technology. In some embodiments, display 238 may comprise multiple displays. The control panel 252 may be configured to receive user inputs (e.g., exam type, imaging parameters). The control panel 252 may include one or more hard controls (e.g., buttons, knobs, dials, encoders, mouse, trackball or others). In some embodiments, the control panel 252 may additionally or alternatively include soft controls (e.g., GUI control elements or simply, GUI controls) provided on a touch sensitive display. In some embodiments, display 238 may be a touch sensitive display that includes one or more soft controls of the control panel 252.

In some embodiments, various components shown in FIG. 2 may be combined. For instance, the image processor 236 and graphics processor 240 may be implemented as a single processor. In some embodiments, various components shown in FIG. 2 may be implemented as separate components. For example, signal processor 226 may be implemented as separate signal processors for each imaging mode (e.g., B-mode, Doppler). In another example, the image processor 236 may be implemented as separate processors for different tasks and/or parallel processing of a same task. In some embodiments, one or more of the various processors shown in FIG. 2 may be implemented by general purpose processors and/or microprocessors configured to perform the specified tasks. In some examples, the processors may be configured by providing instructions for the tasks from a non-transitory computer readable medium (e.g., from local memory 242). The instructions may then be executed by the processors. In some embodiments, one or more of the various processors may be implemented as application specific circuits. In some embodiments, one or more of the various processors (e.g., image processor 236) may be implemented with one or more graphical processing units (GPU).

According to examples of the present disclosure, one or more processors of system 200, such as image processor 236 and/or graphics processor 240, may automatically or semi-automatically annotate ultrasound images acquired by the system 200.

In some examples, the one or more processors may include any one or more machine learning, artificial intelligence (AI) algorithms, and/or multiple neural networks (collectively, AI models) trained to annotate ultrasound images. In some examples, the one or more processors may include one or more of a deep neural network (DNN), a convolutional neural network (CNN), a recurrent neural network (RNN), an autoencoder neural network and/or single-shot-detector, or the like. The AI models may be implemented in hardware (e.g., neurons of a neural network are represented by physical components) and/or software (e.g., neurons and pathways implemented in a software application) components. Neural networks implemented according to the present disclosure may use a variety of topologies and learning algorithms for training the neural networks to produce the desired output. For example, a software-based neural network may be implemented using a processor (e.g., single or multi-core CPU, a single GPU or GPU cluster, or multiple processors arranged for parallel-processing) configured to execute instructions, which may be stored in computer readable medium, and which when executed cause the processor to perform a trained algorithm. In some examples, the one or more processors may implement AI in combination with other image processing or data analysis methods (e.g., segmentation, histogram analysis, statistical analysis).

In various examples, the AI models may be trained using any of a variety of currently known or later developed learning techniques to obtain a neural network (e.g., a trained algorithm or hardware-based system of nodes) that is configured to analyze input data in the form of ultrasound images, usage data, probe tracking data, user inputs, measurements, and/or statistics. In some embodiments, the AI may be statically trained. That is, the AI models may be trained with a data set and deployed on the system 200 and implemented by one or more processors. In some embodiments, the AI models may be dynamically trained. In these examples, the AI models may be trained with an initial data set and deployed on the system 200. However, the AI models may continue to train and be modified based on ultrasound images acquired by the system 200 after deployment of the AI models on the system and implemented by one or more processors.

In some examples, the ultrasound imaging system 200 may receive and store usage data in a computer readable medium, such as local memory 242. Examples of usage data include, but are not limited to, annotations added to ultrasound images, which ultrasound image from a cinebuffer selected for acquisition (e.g., storage), keystrokes, button pushes, other manipulation of hard controls (e.g., turning a dial, flipping a switch), screen touches, other manipulation of soft controls (e.g., swiping, pinching), menu selections and navigation, and voice commands. In some examples, additional usage data may be received such as geographical location of the ultrasound system, type of ultrasound probe used (e.g., type, make, model), unique user identifier, type of exam, and/or what object is currently being imaged by the ultrasound imaging system. In some examples, usage data may be provided by a user via a user interface, such as user interface 224, a processor, such as image processor 236 and/or graphics processor 240, the ultrasound probe (e.g., ultrasound probe 212), and/or preprogrammed and stored in ultrasound imaging system (e.g., local memory 242).

In some examples, some or all of the usage data may be written to and stored in computer readable files, such as log files, for later retrieval and analysis. In some examples, a log file may store a record of some or all of a user's interactions with the ultrasound imaging system. The log file may include time and/or sequence data such that the time and/or sequence of the different interactions the user had with the ultrasound imaging system may be determined. Time data may include a time stamp that is associated with each interaction (e.g., each keystroke, each annotation on an ultrasound image). In some examples, the log file may store the interactions in a list in the order the interactions occurred such that the sequence of interactions can be determined, even if no time stamp is included in the log file. In some examples, the log file may indicate a particular user that is associated with the interactions recorded in the log file. For example, if a user logs into the ultrasound imaging system with a unique identifier (e.g., username, password), the unique identifier may be stored in the log file. The log file may be a text file, a spreadsheet, a database, and/or any other suitable file or data structure that can be analyzed by one or more processors. In some examples, one or more processors of the ultrasound imaging system may collect the usage data and write the usage data to one or more log files, which may be stored in the computer readable medium. In some examples, log files and/or other usage data may be received by the imaging system from one or more other imaging systems. The log files and/or other usage data may be stored in the local memory. The log files and/or other usage data may be received by any suitable method, including wireless (e.g., BlueTooth, WiFi) and wired (e.g., Ethernet cable, USB device) methods. In some examples, usage data from one or more users as well as from one or more imaging systems may be used for automatically and/or semi-automatically annotating ultrasound images.

Figure 3:
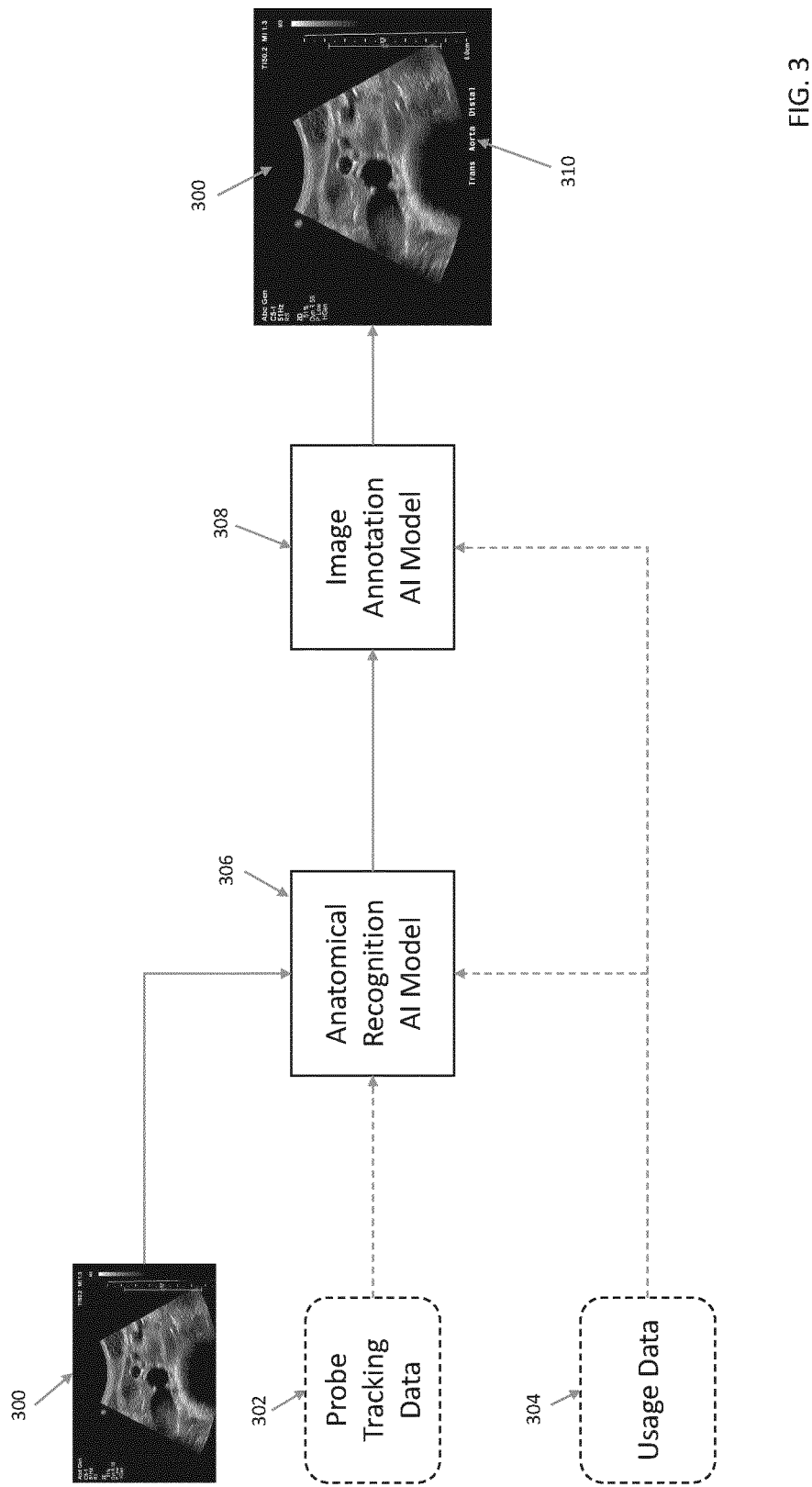
FIG. 3 is a block diagram providing an overview of the data flow in an ultrasound imaging system in accordance with examples of the present disclosure.

FIG. 3 is a block diagram providing an overview of the data flow in an ultrasound imaging system in accordance with examples of the present disclosure. An anatomical recognition AI model 306 may be implemented by one or more processors, such as image processor 236 of system 200. The anatomical recognition model 306 may receive an ultrasound image 300. The ultrasound image 300 may have been acquired by a probe, such as probe 212. In some examples, the anatomical recognition AI model 306 may be trained to identify one or more anatomical features in the ultrasound image 300. The anatomical features may include organs, sub-regions of organs, and/or features of organs. In some examples, anatomical recognition AI model 306 may be trained to identify the imaging plane from which the ultrasound image 300 was acquired. In some examples, anatomical recognition AI model 306 may be trained to identify the location and/or orientation of the ultrasound probe when the ultrasound image 300 was acquired. In some examples, the anatomical recognition AI model 306 may continuously attempt to recognize anatomical features in the ultrasound image 300 as the user is scanning with the probe. In some examples, the anatomical recognition AI model 306 may wait until the user has frozen the image.

Optionally, the anatomical recognition AI model 306 may further receive probe tracking data 302. The probe tracking data 302 may be provided, at least in part, by a probe tracking device, such as probe tracking device 270, and/or a probe tracking system, such as probe tracking system 272. The anatomical recognition AI model 306 may analyze the probe tracking data 302 to assist in determining the anatomical features, image plane, location of the ultrasound probe, and/or orientation of the ultrasound probe.

Optionally, the anatomical recognition AI model 306 may further receive usage data 304. The usage data 304 may be provided by a user interface, such as user interface 224, and/or a log file. The anatomical recognition AI model 306 may analyze the usage data 304 to assist in determining the anatomical features, image plane, location of the ultrasound probe, and/or orientation of the ultrasound probe. For example, the usage data 304 may include a previously acquired ultrasound image and/or annotations applied to a previously acquired ultrasound image.

The anatomical features, image plane, location of the ultrasound probe, and/or orientation of the ultrasound probe determined by the anatomical recognition AI model 306 may be provided to an image annotation AI model 308. The image annotation AI model 308 may be trained to apply one or more annotations 310 to the image 300 based, at least in part, on an analysis of the output of the anatomical recognition AI model 306. In the example shown in FIG. 3, the image annotation AI model 308 provides image 300 with a label 310 (trans aorta distal).

Optionally, in some examples, the image annotation AI model 308 may receive usage data 304. The image annotation AI model 308 may analyze the usage data 304 to assist in determining the annotation to apply to the image 300. For example, image annotation AI model 308 may analyze the usage data 304 determine whether the user prefers to use "long" or "sagittal" in annotations. In another example, image annotation AI model 308 may analyze the usage data 304 to determine whether the user prefers to use bodymarkers, labels, and/or both as annotations. In a further example, image annotation AI model 308 may analyze previously applied annotations included in the usage data 304 to determine the annotation to apply to a current image.

In some examples, the anatomical recognition AI model 306 may perform image recognition and image annotation model 308 may apply annotations automatically without any user intervention. In some examples, the AI models 306, 308 may perform their respective tasks semi-automatically. In these examples, a user may acquire an initial ultrasound image and manually apply annotations (e.g., labels, bodymarkers, combination thereof). The AI models 306, 308 may use the image annotated by the user as a "seed" to make their respective determinations.

In some examples, when the anatomical recognition AI model 306 performs determinations while the user is scanning, the annotations 310 may also be determined and provided by the image annotation AI model 308 to a display, such as display 238, while scanning. Thus, the annotations 310 may change as the user scans in different locations and/or orientations. However, some users may find the changing annotations 310 distracting. Accordingly, in some examples, the annotations 310 may be provided when the probe tracking data 302 indicates the probe is stationary. In other examples, the annotations 310 may be provided when the user freezes the current image.

Once the image 300 and annotations 310 are provided on the display, the user may accept the annotations 310 by saving the annotated image 300 without changes. If the user believes the annotations 310 are incorrect and/or prefers a different style of annotations 310 (e.g., atrium versus auricle, superior versus upper), the user may remove and/or change the annotations 310 via the user interface prior to saving the image 300. In some examples, whether the user accepts the annotations 310 provided by image annotation AI model 308 or changes the annotations 310 may be saved by the ultrasound imaging system and used to train the image annotation AI model 308 and/or anatomical recognition AI model 306.

Although two separate AI models are shown in FIG. 3, in some examples, anatomical recognition AI model 306 and image annotation AI model 308 may be implemented as a single AI model that performs the tasks of both AI models 306, 308. In some examples, anatomical recognition AI model 306 and/or image annotation AI model 308 may implement a combination of AI models and analysis techniques not traditionally considered AI models (e.g., statistical analysis) to make determinations.

Figure 4:
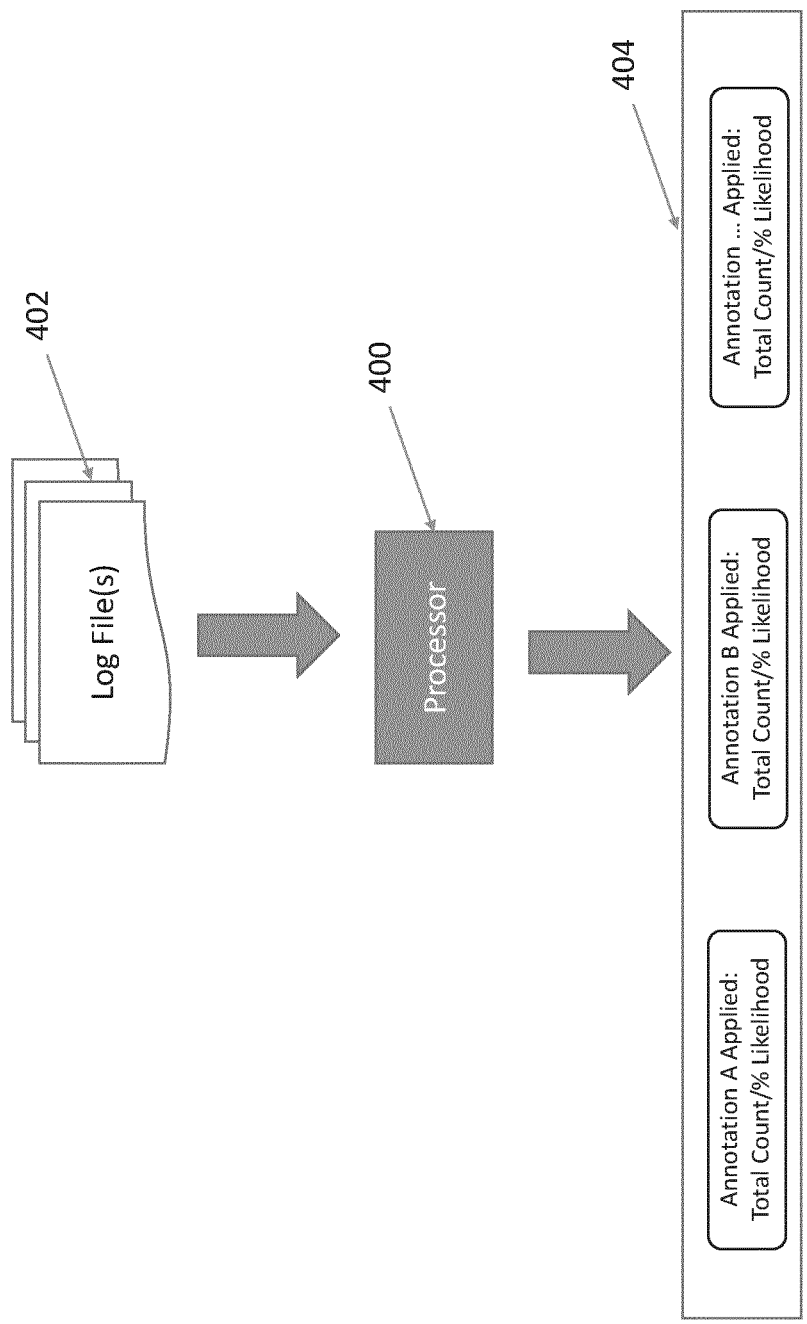
FIG. 4 is a graphical depiction of an example of statistical analysis of one or more log files in accordance with examples of the present disclosure.

In some examples, the usage data (e.g., such as usage data stored in one or more log files) may be analyzed by statistical methods. A graphical depiction of an example of statistical analysis of one or more log files in accordance with examples of the present disclosure is shown in FIG. 4. A processor 400 of an ultrasound imaging system, such as ultrasound imaging system 200, may receive one or more log files 402 for analysis. Processor 400 may be implemented by image processor 236 and/or graphics processor 240 in some examples. In some examples, processor 400 may implement one or more AI models, such as AI model 306 and/or AI model 308. The processor 400 may analyze the usage data in the log files 402 to calculate various statistics relating to user inputs (e.g., annotations, ultrasound images acquired) to provide one or more outputs 404. In the specific example shown in FIG. 4, the processor 400 may determine a total number of times one or more annotations (e.g., Annotation A, Annotation B, Annotation C) were selected (e.g., selected on a control panel and/or a menu) and/or accepted (e.g., the ultrasound imaging system automatically or semi-automatically applied an annotation and the annotation was not changed by the user) by one or more users, and the percent likelihood that each of the one or more annotations may be selected and/or accepted. In some examples, the percent likelihood may be based on a total number of times a particular annotation was selected divided by a total number of all annotation selections.

In some examples, the output 404 of processor 400 may be used to determine user preferred language and/or graphics for annotations. For example, output 404 may be used to determine if a user prefers to use "RT" or "RIGHT" as a label to annotate an image of the right kidney.

Figure 5:
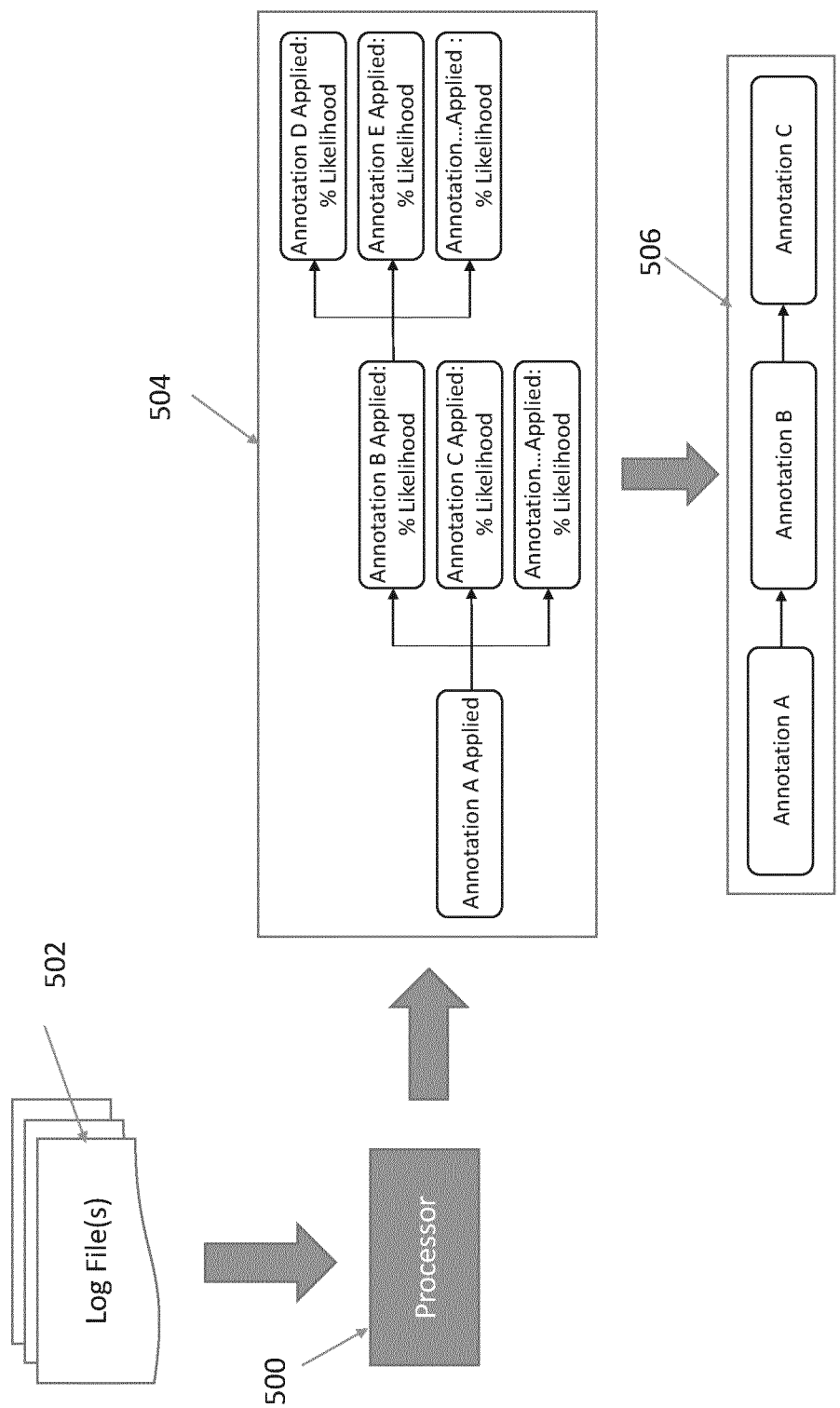
FIG. 5 is a graphical depiction of an example of statistical analysis of one or more log files in accordance with examples of the present disclosure.

A graphical depiction of another example of statistical analysis of one or more log files in accordance with examples of the present disclosure is shown in FIG. 5. A processor 500 of an ultrasound imaging system, such as ultrasound imaging system 200, may receive one or more log files 502 for analysis. Processor 500 may be implemented by image processor 236 and/or graphics processor 240 in some examples. In some examples, processor 500 may implement one or more AI models, such as AI model 306 and/or AI model 308. The processor 500 may analyze the usage data in the log files 502 to calculate various statistics relating to annotations selected and/or accepted by one or more users to provide one or more outputs 504, 506. As shown in FIG. 5, the processor 500 may analyze the log files to determine one or more sequences of annotation selections/acceptances. The processor 500 may use a moving window to search for sequences, may search for specific commands and/or annotation selections that indicate a start of a sequence (e.g., "freeze," "exam type"), and/or other methods (e.g., sequence ends when a time interval between annotation selections exceeds a maximum duration). For one or more annotation selections that begin a sequence, the processor 500 may calculate a percentage likelihood of the next annotation selected. For example, as shown in output 504, when Annotation A is applied at a beginning of a sequence, the processor 500 calculates the probability (e.g., percent likelihood) that one or more other annotations (e.g., Annotations B, C, etc.) is selected/accepted next in the sequence. As shown in output 504, the processor 500 may further calculate the probability that one or more other annotations (e.g., Annotation D, Annotation E, etc.) is selected after one or more of the other controls selected after Annotation A. This calculation of probabilities may continue for any desired sequence length.

Based on the output 504, the processor 500 may calculate a most likely sequence of annotations selected and/or accepted by a user. As shown in output 506, it may be determined that Annotation B has the highest probability of being selected by a user after Annotation A is applied to an ultrasound image by the user and Annotation C has the highest probability of being applied by the user after Annotation B has been selected by the user.

In some examples, the output 506 of processor 500 may be used to determine one or more annotations to apply to an ultrasound image based, at least in part, on previously applied annotations. In some applications, this may allow automatic and/or semi-automatic annotations to adapt to a particular protocol of a clinic and/or individual user.

The analysis of log files, including the examples of statistical analysis described with reference to FIGS. 4 and 5, may be performed as usage data is being received and recorded (e.g., live capture) to the log files and/or analysis may be performed at a later time (e.g., a pause in a workflow, end of an exam, logoff of the user). While statistical analysis of log files have been described, in some examples, one or more processors (e.g., image processor 236, graphics processor 240) of an ultrasound imaging system may implement one or more trained AI models for analyzing usage data whether in log files or other formats (e.g., live capture prior to storing in a log file).

Examples of AI models that may be used to analyze usage data and/or ultrasound images include, but are not limited to, decision trees, convolutional neural networks, and long short term memory (LSTM) networks. In some examples, probe tracking data, such as probe tracking data 302, may also be analyzed by one or more AI models. In some examples, using one or more AI models may allow for faster and/or more accurate determination of anatomical features in an ultrasound image, imaging plane, probe location, probe orientation, and/or annotations to be applied to the ultrasound image compared to non-AI model techniques.

Figure 6:
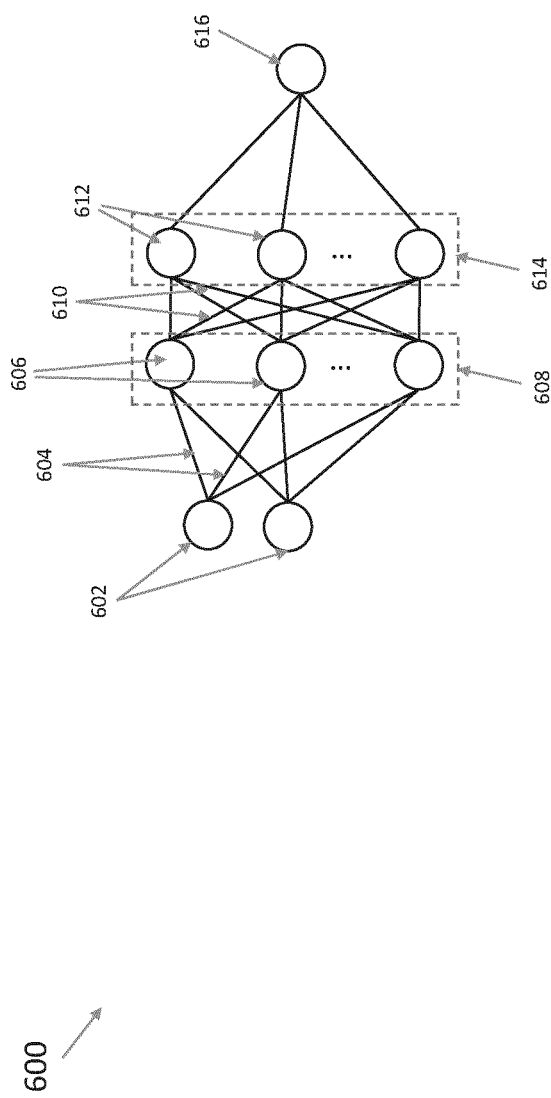
FIG. 6 is an illustration of a neural network that may be used to data in accordance with examples of the present disclosure.

FIG. 6 is an illustration of a neural network that may be used to analyze data in accordance with examples of the present disclosure. In some examples, the neural network 600 may be implemented by one or more processors (e.g., image processor 236, graphics processor 240) of an ultrasound imaging system, such as ultrasound imaging system 200. In some examples, neural network 600 may be included in AI model 306 and/or AI model 308. In some examples, neural network 600 may be a convolutional network with single and/or multidimensional layers. The neural network 600 may include one or more input nodes 602. In some examples, the input nodes 602 may be organized in a layer of the neural network 600. The input nodes 602 may be coupled to one or more layers 608 of hidden units 606 by weights 604. In some examples, the hidden units 606 may perform operations on one or more inputs from the input nodes 602 based, at least in part, with the associated weights 604. In some examples, the hidden units 606 may be coupled to one or more layers 614 of hidden units 612 by weights 610. The hidden units 612 may perform operations on one or more outputs from the hidden units 606 based, at least in part, on the weights 610. The outputs of the hidden units 612 may be provided to an output node 616 to provide an output (e.g., inference, determination, prediction) of the neural network 600. Although one output node 616 is shown in FIG. 6, in some examples, the neural network may have multiple output nodes 616. In some examples, the output may be accompanied by a confidence level. The confidence level may be a value from, and including, 0 to 1, where a confidence level 0 indicates the neural network 600 has no confidence that the output is correct and a confidence level of 1 indicates the neural network 600 is 100% confident that the output is correct.

In some examples, inputs to the neural network 600 provided at the one or more input nodes 602 may include log files, live capture usage data, probe tracking data, and/or images acquired by an ultrasound probe. In some examples, outputs provided at output node 616 may include a prediction of a next annotation applied to an image, a prediction of annotations likely to be used by a particular user, annotations likely to be used during a particular exam type, and/or annotations likely to be used when a particular anatomical feature is being imaged. In some examples, outputs provided at output node 616 may include a determination of one or more anatomical features in an ultrasound image (e.g., organs, sub-regions of organs, and/or features of organs), the imaging plane from which the ultrasound image was acquired, the location, and/or orientation of the ultrasound probe when the ultrasound image was acquired.

The outputs of neural network 600 may be used by an ultrasound imaging system to automatically or semi-automatically apply annotations to ultrasound images.

Figure 7:
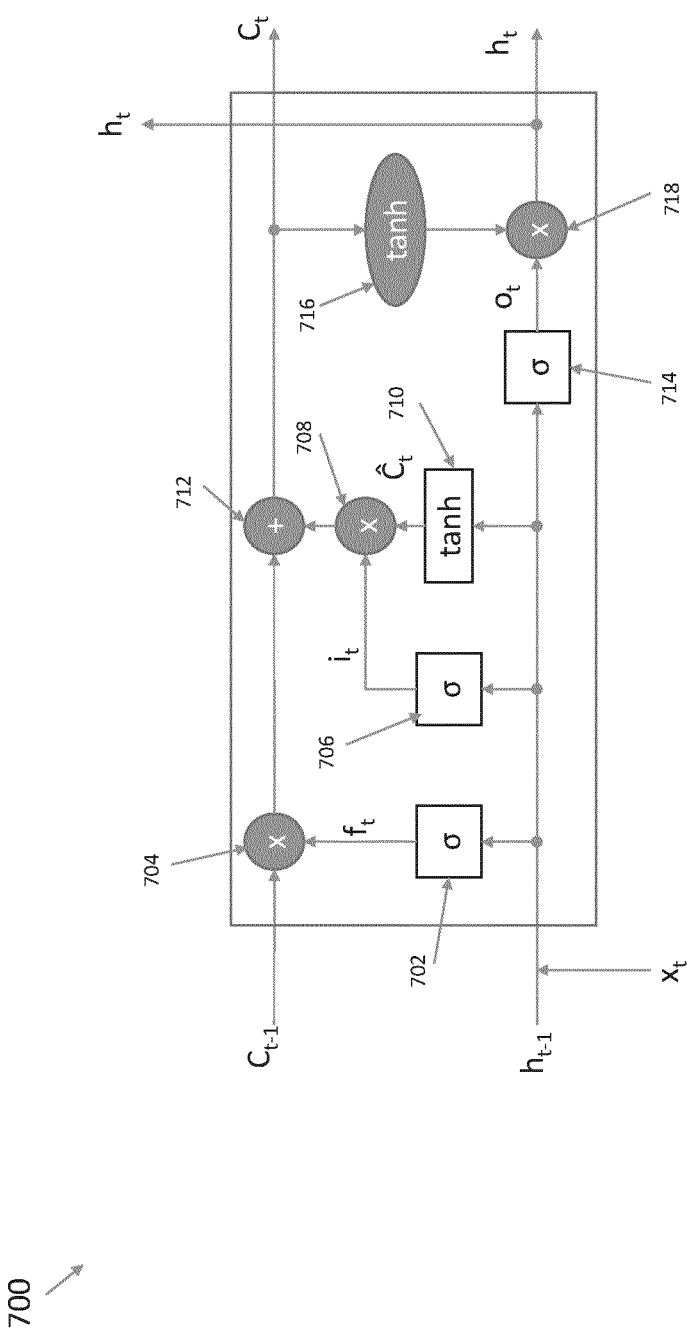
FIG. 7 is an illustration of a cell of a long short term memory model that may be used to analyze data in accordance with examples of the present disclosure.

FIG. 7 is an illustration of a cell of a long short term memory (LSTM) model that may be used to analyze data in accordance with examples of the present disclosure. In some examples, the LSTM model may be implemented by one or more processors (e.g., image processor 236, graphics processor 240) of an ultrasound imaging system such as ultrasound imaging system 200. A LSTM model is a type of recurrent neural network that is capable learning long-term dependencies. Accordingly, LSTM models may be suitable for analyzing and predicting sequences, such as sequences of annotations applied, images acquired, and/or movements of an ultrasound probe. An LSTM model typically includes multiple cells coupled together. The number of cells may be based, at least in part, on a length of a sequence to be analyzed by the LSTM. For simplicity, only a single cell 700 is shown in FIG. 7. In some examples, an LSTM including cell 700 may be included in AI model 306 and/or AI model 308.

The variable C, running across the top of cell 700 is the state of the cell. The state of the previous LSTM cell $C_{t-1}$ may be provided to cell 700 as an input. Data can be selectively added or removed from the state of the cell by cell 700. The addition or removal of data is controlled by three "gates," each of which includes a separate neural network layer. The modified or unmodified state of cell 700 may be provided by cell 700 to the next LSTM cell as $C_t$.

The variable h, running across the bottom of the cell 700 is the hidden state vector of the LSTM model. The hidden state vector of the previous cell $h_{t-1}$ may be provided to cell 700 as an input. The hidden state vector $h_{t-1}$ may be modified by a current input $x_t$ to the LSTM model provided to cell 700. The hidden state vector may also be modified based on the state of the cell 700 $C_t$. The modified hidden state vector of cell 700 may be provided as an output $h_t$. The output $h_t$ may be provided to the next LSTM cell as a hidden state vector and/or provided as an output of the LSTM model.

Turning now to the inner workings of cell 700, a first gate (e.g., the forget gate) for controlling a state of the cell C includes a first layer 702. In some examples, this first layer is a sigmoid layer. The sigmoid layer may receive a concatenation of the hidden state vector $h_{t-1}$ and the current input $x_t$. The first layer 702 provides an output $f_t$, which includes weights that indicate which data from the previous cell state should be "forgotten" and which data from the previous cell state should be "remembered" by cell 700. The previous cell state $C_{t-1}$ is multiplied by $f_t$ at point operation 704 to remove any data that was determined to be forgotten by the first layer 702.

A second gate (e.g., the input gate) includes a second layer 706 and a third layer 710. Both the second layer 706 and the third layer 710 receive the concatenation of the hidden state vector $h_{t-1}$ and the current input $x_t$. In some examples, the second layer 706 is a sigmoid function. The second layer 706 provides an output it which includes weights that indicate what data needs to be added to the cell state C. The third layer 710 may include a tanh function in some examples. The third layer 710 may generate a vector $\hat{C}_t$ that includes all possible data that can be added to the cell state from $h_{t-1}$ and $x_t$. The weights it and vector $C_t$ are multiplied together by point operation 708. The point operation 708 generates a vector that includes the data to be added to the cell state C.

The data is added to the cell state C to get the current cell state $C_t$ at point operation 712.

A third gate (e.g., the output gate) includes a fourth layer 714. In some examples, the fourth layer 714 is a sigmoid function. The fourth layer 714 receives the concatenation of the hidden state vector $h_{t-1}$ and the current input $x_t$ and provides an output of which includes weights that indicate what data of the cell state $C_t$ should be provided as the hidden state vector $h_t$ of cell 700. The data of the cell state $C_t$ is turned into a vector by a tanh function at point operation 716 and is then multiplied by or by point operation 718 to generate the hidden state vector/output vector $h_t$. In some examples, the output vector $h_t$ may be accompanied by a confidence value, similar to the output of a convolutional neural network, such as the one described in reference to FIG. 6.

As pictured in FIG. 7, cell 700 is a "middle" cell. That is, the cell 700 receives inputs $C_{t-1}$ and $h^{t-1}$ from a previous cell in the LSTM model and provides outputs $C_t$ and $h_t$ to a next cell in the LSTM. If cell 700 were a first cell in the LSTM, it would only receive input $x_t$. If cell 700 were a last cell in the LSTM, the outputs $h_t$ and $C_t$ would not be provided to another cell.

In some examples where a processor of an ultrasound imaging system (e.g., image processor 236, graphics processor 240) implements an LSTM model, the current input $x_t$ may include data related to annotations applied to ultrasound images, ultrasound images and/or probe tracking data. The hidden state vector $h_{t-1}$ may include data related to a previous prediction, such as of an annotation, an anatomical feature in an ultrasound image, a location and/or orientation of an ultrasound probe, and/or an image plane. The cell state $C_{t-1}$ may include data related to previous annotations selected and/or accepted by a user. In some examples, output(s) h, of the LSTM model may be used by the processor and/or another processor of the ultrasound imaging system to apply an annotation to an ultrasound image.

Figure 8:
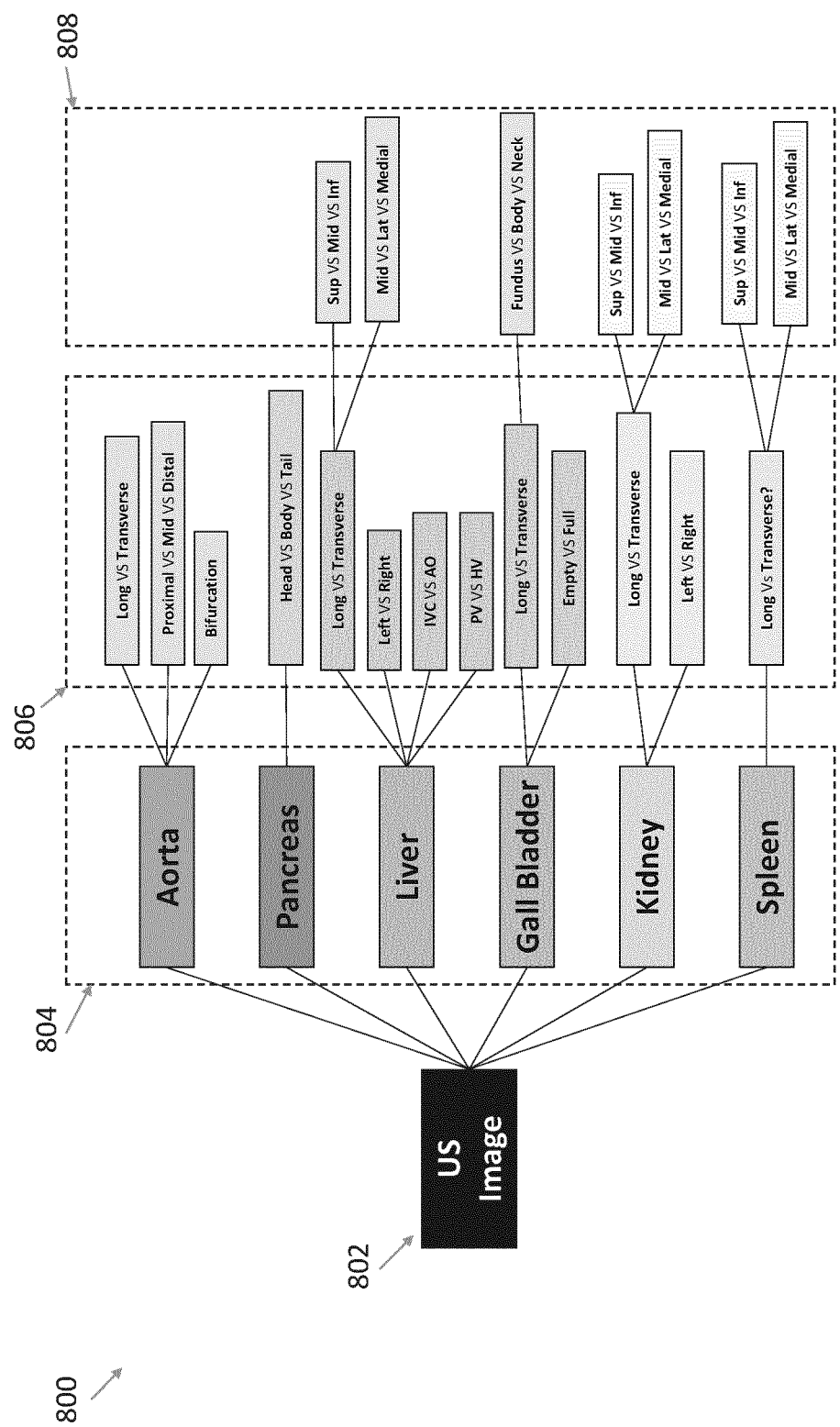
FIG. 8 is an illustration of a decision tree that may be used to analyze data in accordance with examples of the present disclosure.

FIG. 8 is an illustration of a decision tree that may be used to analyze data in accordance with examples of the present disclosure. In some examples, the decision tree 800 may be implemented by one or more processors (e.g., image processor 236, graphics processor 240) of an ultrasound imaging system such as ultrasound imaging system 200. In some examples, decision tree 800 may be included in AI model 306 and/or AI model 308.

The decision tree 800 includes multiple layers 804, 806, 808 of tests to make a determination about an input 802. The test applied at a particular layer may be based, at least in part, on a determination made at a previous layer. In the example shown in FIG. 8, the decision tree 800 is implemented to analyze ultrasound image data, and an ultrasound image is provided as input 802. However, in other examples, the decision tree 800 may be implemented to analyze other types of data (e.g., usage data, probe tracking data) or additional types of data. For example, input 802 may include both the ultrasound image and probe tracking data.

In a first decision layer 804, an organ is identified in the ultrasound image provided as input 802. In some examples, the first decision layer 804 may include an AI model, such as neural network 600, to determine the organ in the image. At a second decision layer 806, one or more additional decisions may be made, depending on what organ was identified in decision layer 804. For example, if a liver was identified, at the second decision layer 806, decisions as to whether ultrasound image was acquired along the long (e.g., sagittal) or transverse plane of the liver, whether the image was acquired from the left or right side of the liver, whether inferior vena cava or aorta is visible in the image, and/or whether portal hypertension or variceal hemorrhage are present. In some examples, one or more decisions may be determined using one or more AI models (e.g., neural network, LSTM). In some examples, the same data (e.g., the ultrasound image) used in the first decision layer 804 may be used. In some examples, different and/or additional data may be used to make determinations in the second decision layer 806. For example, probe tracking data may be used in addition to the ultrasound image.

Depending on the decisions made in the second decision layer 806, additional decisions may be made in a third decision layer 808. For example, once the long or transverse plane is determined, whether it is the superior, middle, or inferior region of the liver or whether it is the middle, lateral, or medial region of the liver may be determined. Similar to the first and second decision layers 804, 806, the third decision layer 808 may use one or more AI models to make one or more of the determinations.

Once all of the determinations have been made, one or more of the determinations of one or more of the decision layers 804, 806, 808 may be provided as an output. In some examples, the output may be used to determine an annotation to be applied to an ultrasound image. Although three decision layers are shown in the example provided in FIG. 8, decision tree 800 may include more or fewer decision layers in other examples.

As described herein, the AI models (e.g., AI model 306, AI model 308, neural network 600, LSTM including cell 700, and decision tree 800) may provide confidence levels associated with one or more outputs. In some examples, a processor (e.g., image processor 236, graphics processor 240) may only apply an annotation to an ultrasound image if the confidence level associated with the output is equal to or above a threshold value (e.g., over 50%, over 70%, over 90%, etc.). In some examples, if the confidence level is below the threshold value, the processor may not apply an annotation to the ultrasound image. In some examples, this may mean not doing anything and/or prompting the user to manually provide an annotation.

Although a convolutional neural network, LSTM model, and a decision tree have been described herein, these AI models have been provided only as examples, and the principles of the present disclosure are not limited to these particular models. Furthermore, in some examples, the statistical analysis techniques, such as those described in reference with FIGS. 4 and 5 may be used in combination with one or more of the AI models for analyzing data. In some examples, the AI models and/or statistical analysis techniques may be implemented, at least in part, by one or more processors executing computer readable instructions. The computer readable instructions may be provided to the one or more processors by a non-transitory computer readable memory, such as local memory 242.

Figure 9:
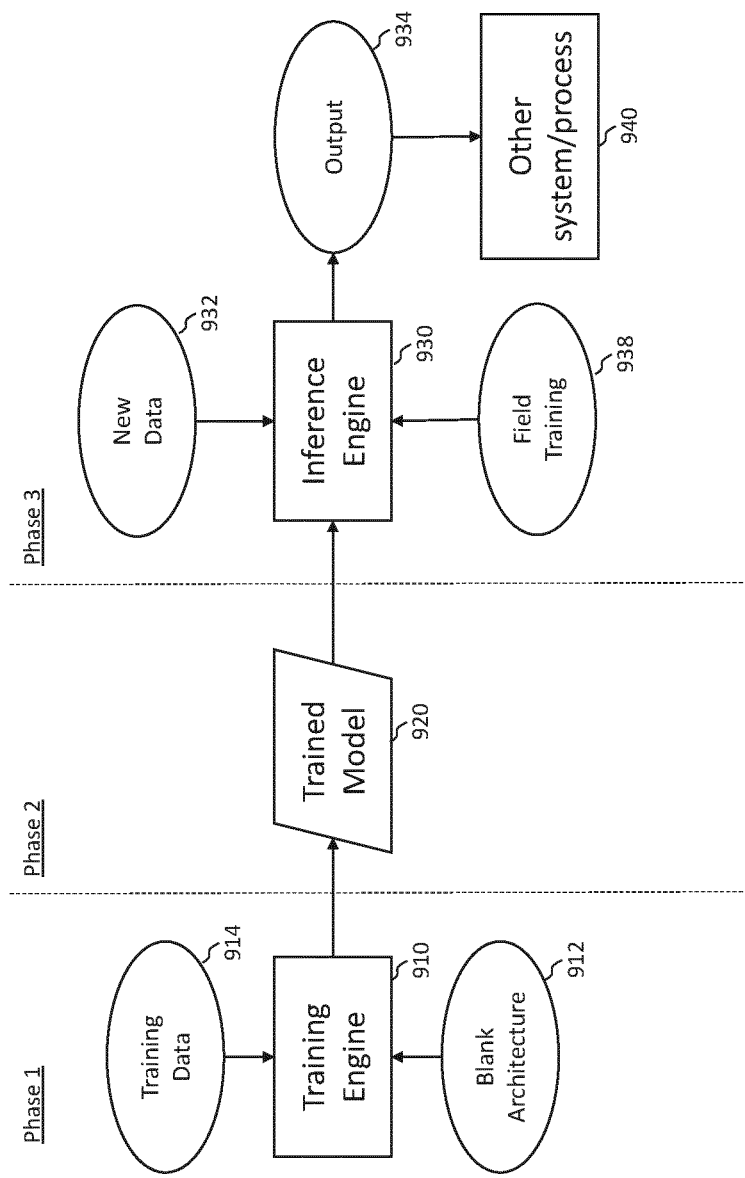
FIG. 9 is a block diagram of a process for training and deployment of a neural network in accordance with the principles of the present disclosure.

FIG. 9 shows a block diagram of a process for training and deployment of a neural network in accordance with the principles of the present disclosure. The process shown in FIG. 9 may be used to train an AI model implemented by a medical imaging system, such as the AI models 306, 308 shown in FIG. 3. The left hand side of FIG. 9, phase 1, illustrates the training of an AI model. To train the AI model, training sets which include multiple instances of input data and output classifications may be presented to the training algorithm(s) of the AI model(s) (e.g., AlexNet training algorithm, as described by Krizhevsky, A., Sutskever, I. and Hinton, G. E. "*ImageNet Classification with Deep Convolutional Neural Networks*," NIPS 2012 or its descendants).

Training may involve the selection of a starting architecture 912 and the preparation of training data 914. The starting architecture 912 may be a blank architecture (e.g., an architecture with defined layers and arrangement of nodes but without any previously trained weights) or a partially trained model, such as the inception networks, which may then be further tailored for classification of ultrasound images, tracking data, and/or usage data. The starting architecture 912 (e.g., blank weights) and training data 914 are provided to a training engine 910 (e.g., ADAM optimizer) for training the model. Upon sufficient number of iterations (e.g., when the model performs consistently within an acceptable error), the model 920 is said to be trained and ready for deployment, which is illustrated in the middle of FIG. 9, phase 2. The right hand side of FIG. 9, or phase 3, the trained model 920 is applied (via inference engine 930) for analysis of new data 932, which is data that has not been presented to the model during the initial training (in phase 1). For example, the new data 932 may include unknown images such as live ultrasound images acquired during a scan of a patient and/or annotations manually applied to unknown images by a user. The trained model 920 implemented via engine 930 is used to classify the unknown images in accordance with the training of the model 920 to provide an output 934 (e.g., anatomical features, image plane, position and/or orientation of a probe, annotations). The output 934 may then be used by the system for subsequent processes 940 (e.g., applying an annotation, generating an annotated image). In some examples, where the trained model is dynamically trained, additional data, shown as field training 938, may be provided to inference engine 930. Additional data may include the new data 932, data indicating whether a user accepted or changed the provided annotations, and/or other data.

In the embodiments where the trained model 920 is used to implement a neural network executed by a processor, such as image processor 236 and/or graphics processor 240, the starting architecture may be that of a convolutional neural network, or a deep convolutional neural network. The training data 914 may include multiple (hundreds, often thousands or even more) annotated images, associated usage data, and/or associated probe tracking data.

Figure 10:
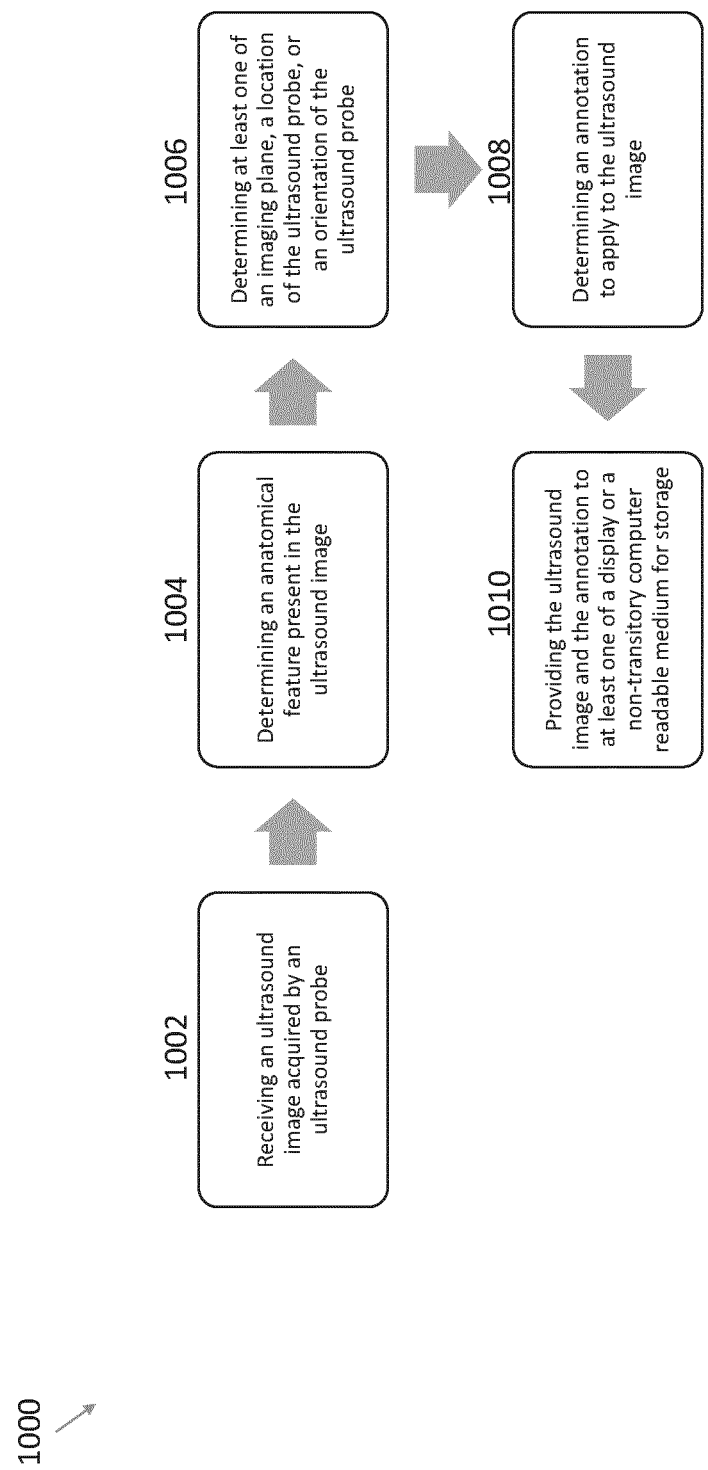
FIG. 10 is a flow chart of a method in accordance with principles of the present disclosure.

FIG. 10 is a flow chart of a method in accordance with the examples of the present disclosure. The method 1000 may be a method for annotating ultrasound images automatically or semi-automatically. In some examples, the method 1000 may be performed by an ultrasound imaging system, such as ultrasound imaging system 200. In some examples, all or part of the method 1000 may be performed by one or more processors, such as image processor 236 and/or graphics processor 240. In some examples, the one or more processors may implement one or more AI models, such as those shown in FIGS. 3 and 6-8 to perform some or all of method 1000. In some examples the one or more processors may implement one or more statistical analysis techniques, such as those shown in FIGS. 4 and 5 to perform some or all of method 1000.

One or more processors of an ultrasound imaging system, may receive an ultrasound image acquired by an ultrasound probe as indicated by block 1002. Based, at least in part, on the ultrasound image, the one or more processors may determine an anatomical feature present in the ultrasound image as indicated by block 1004. In some examples, the one or more processors may further determine at least one of an imaging plane, a location of the ultrasound probe, or an orientation of the ultrasound probe as indicated by block 1006. As indicated by block 1008, the one or more processors may determine an annotation to apply to the ultrasound image. The determined annotation may be based, at least in part, on the determined anatomical feature and the at least one of the determined imaging plane, the determined location of the ultrasound probe, or the determined orientation of the ultrasound probe. The one or more processors may provide the ultrasound image and the annotation to at least one of a display or a non-transitory computer readable medium for storage as indicated by block 1010.

In some examples, the one or more processors may further receive probe tracking data and/or usage data for making the determinations in block 1004, 1006 and/or 1008. In some examples, one or more of the determinations may be performed, at least in part, by one or more AI models and/or statistical analysis methods.

Figure 11:
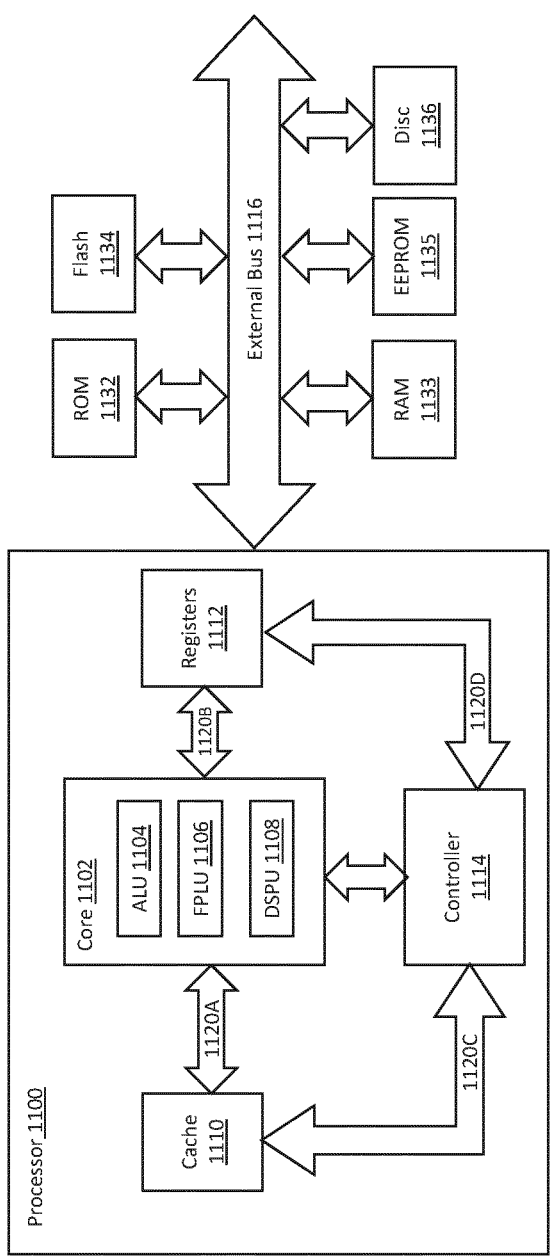
FIG. 11 is a block diagram illustrating an example processor in accordance with principles of the present disclosure.

FIG. 11 is a block diagram illustrating an example processor 1100 according to principles of the present disclosure. Processor 1100 may be used to implement one or more processors and/or controllers described herein, for example, image processor 236 shown in FIG. 2 and/or any other processor or controller shown in FIG. 2. Processor 1100 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 1100 may include one or more cores 1102. The core 1102 may include one or more arithmetic logic units (ALU) 1104. In some embodiments, the core 1102 may include a floating point logic unit (FPLU) 1106 and/or a digital signal processing unit (DSPU) 1108 in addition to or instead of the ALU 1104.

The processor 1100 may include one or more registers 1112 communicatively coupled to the core 1102. The registers 1112 may be implemented using dedicated logic gate circuits (e.g., flip-flops) and/or any memory technology. In some embodiments the registers 1112 may be implemented using static memory. The register may provide data, instructions and addresses to the core 1102.

In some embodiments, processor 1100 may include one or more levels of cache memory 1110 communicatively coupled to the core 1102. The cache memory 1110 may provide computer-readable instructions to the core 1102 for execution. The cache memory 1110 may provide data for processing by the core 1102. In some embodiments, the computer-readable instructions may have been provided to the cache memory 1110 by a local memory, for example, local memory attached to the external bus 1116. The cache memory 1110 may be implemented with any suitable cache memory type, for example, metal-oxide semiconductor (MOS) memory such as static random access memory (SRAM), dynamic random access memory (DRAM), and/or any other suitable memory technology. Computer-readable mediums such as the above may store the instructions that when executed by a processor deploy the presently disclosed techniques.

The processor 1100 may include a controller 1114, which may control input to the processor 1100 from other processors and/or components included in a system (e.g., control panel 252 and scan converter 230 shown in FIG. 2) and/or outputs from the processor 1100 to other processors and/or components included in the system (e.g., display 238 and volume renderer 234 shown in FIG. 2). Controller 1114 may control the data paths in the ALU 1104, FPLU 1106 and/or DSPU 1108. Controller 1114 may be implemented as one or more state machines, data paths and/or dedicated control logic. The gates of controller 1114 may be implemented as standalone gates, FPGA, ASIC or any other suitable technology.

The registers 1112 and the cache memory 1110 may communicate with controller 1114 and core 1102 via internal connections 1120A, 1120B, 1120C and 1120D. Internal connections may implemented as a bus, multiplexor, crossbar switch, and/or any other suitable connection technology.

Inputs and outputs for the processor 1100 may be provided via a bus 1116, which may include one or more conductive lines. The bus 1116 may be communicatively coupled to one or more components of processor 1100, for example the controller 1114, cache memory 1110, and/or register 1112. The bus 1116 may be coupled to one or more components of the system, such as display 238 and control panel 252 mentioned previously.

The bus 1116 may be coupled to one or more external memories. The external memories may include Read Only Memory (ROM) 1132. ROM 1132 may be a masked ROM, Electronically Programmable Read Only Memory (EPROM) or any other suitable technology. The external memory may include Random Access Memory (RAM) 1133. RAM 1133 may be a static RAM, battery backed up static RAM, Dynamic RAM (DRAM) or any other suitable technology. The external memory may include Electrically Erasable Programmable Read Only Memory (EEPROM) 1135. The external memory may include Flash memory 1134. The external memory may include a magnetic storage device such as disc 1136. In some embodiments, the external memories may be included in a system, such as ultrasound imaging system 200 shown in FIG. 2, for example local memory 242.

The systems, methods, and apparatuses disclosed herein may automatically and/or semi-automatically apply annotations, such as labels and/or bodymarkers, to ultrasound images. In some applications, this may reduce exam time by reducing time required by a user to manually apply the annotations.

Although the examples described herein discuss processing of ultrasound image data, it is understood that the principles of the present disclosure are not limited to ultrasound and may be applied to image data from other modalities such as magnetic resonance imaging and computed tomography.

In various embodiments where components, systems and/or methods are implemented using a programmable device, such as a computer-based system or programmable logic, it should be appreciated that the above-described systems and methods can be implemented using any of various known or later developed programming languages, such as "C", "C++", "C#", "Java", "Python", and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software and firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instruction to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An ultrasound imaging system configured to annotate ultrasound images, the system comprising:
    an ultrasound probe configured to acquire ultrasound signals;
    processing circuitry configured to produce an ultrasound image from the ultrasound signals;
    a non-transitory computer readable medium encoded with instructions and configured to store the ultrasound image;
    at least one processor in communication with the non-transitory computer readable medium and configured to execute the instructions, wherein when executed, the instructions cause the ultrasound imaging system to:
        determine an anatomical feature present in the ultrasound image;
        determine at least one of an imaging plane, a location of the ultrasound probe, or an orientation of the ultrasound probe; and
        determine an annotation to apply to the ultrasound image based, at least in part, on the determined anatomical feature and the at least one of the determined imaging plane, the determined location of the ultrasound probe, or the determined orientation of the ultrasound probe; and
    a display configured to display the ultrasound image, wherein the at least one processor is further configured to provide the annotation for display on the ultrasound image,
    wherein the instructions, in response to execution on the processor, cause the processor to:
    instruct at least one of (i) the removal of the annotation from the display and (ii) cessation of annotation provision to the display, in response to a determination that the ultrasound probe is in motion; and
    instruct at least one of (i) the return of the annotation to the display and (ii) re-provision to the display, in response to a determination that the ultrasound probe is stationary.

2. The system of claim 1, further comprising a user interface configured to allow a user to change the annotation provided by the at least one processor.

3. The system of claim 1, further comprising a user interface configured to receive inputs from a user, wherein the inputs are stored as usage data in the non-transitory computer readable medium, and wherein the annotation is determined based on the usage data.

4. The system of claim 3, wherein the annotation is determined based on statistical analysis of the usage data.

5. The system of claim 1, wherein the providing of the annotation changes in response to a determination that the ultrasound probe is in at least one of a second determined location orientation or a second determined orientation relative to at least one of the determined anatomical feature or identification of a second determined anatomical feature.

6. The system of claim 1, wherein the at least one processor implements one or more artificial intelligence (AI) models to determine at least one of the annotation, the anatomical feature, the imaging plane, the location of the ultrasound probe, or the orientation of the ultrasound probe.

7. The system of claim 6, wherein the one or more AI models comprises a neural network.

8. The system of claim 6, wherein the one or more AI models comprises a decision tree.

9. The system of claim 1, further comprising a probe tracking device coupled to the ultrasound probe and configured to provide probe tracking data to the at least one processor to determine at least one of the anatomical feature, the imaging plane, the location of the ultrasound probe, or the orientation of the ultrasound probe.

10. The system of claim 9, wherein the probe tracking device is an electromagnetic probe tracking device.

11. The system of claim 1, wherein the processing circuitry is contained within the ultrasound probe.

12. The system of claim 1, wherein the annotation comprises a graphical bodymarker.

13. A method for annotating ultrasound images, the method comprising:
receiving an ultrasound image acquired by an ultrasound probe coupled to processing circuitry;
determining, with at least one processor, an anatomical feature present in the ultrasound image;
determining, with the at least one processor, at least one of an imaging plane, a location of the ultrasound probe, or an orientation of the ultrasound probe;
determining, with the at least one processor, an annotation to apply to the ultrasound image based, at least in part, on the determined anatomical feature and the at least one of the determined imaging plane, the determined location of the ultrasound probe, or the determined orientation of the ultrasound probe;
displaying, on a display, the annotation on the ultrasound image;
instructing at least one of (i) removal of the annotation from the display and (ii) cessation of annotation provision to the display, in response to a determination that the ultrasound probe is in motion; and
instructing at least one of (i) return of the annotation to the display and (ii) re-provision to the display, in response to a determination that the ultrasound probe is stationary.

14. The method of claim 13, further comprising receiving probe tracking data from a probe tracking device coupled to the ultrasound probe, wherein determining of the annotation is based on the probe tracking data.

15. The method of claim 13, wherein determining at least one of the annotation, the anatomical feature, the imaging plane, the location of the ultrasound probe, or the orientation of the ultrasound probe is performed by one or more artificial intelligence (AI) models.

16. The method of claim 15, wherein the one or more AI models includes at least one of a neural network, a long short term memory model, or a decision tree.

17. The method of claim 13, further comprising receiving usage data from at least one of a user interface or a non-transitory computer readable medium, wherein determining of the annotation is based on the usage data.

18. A computer-readable medium for annotating ultrasounds, the computer-readable medium comprising instructions that when executed on a processor cause the processor to:
receive an ultrasound image acquired by an ultrasound probe coupled to processing circuitry;
determine, with at least one processor, an anatomical feature present in the ultrasound image;
determine, with the at least one processor, at least one of an imaging plane, a location of the ultrasound probe, or an orientation of the ultrasound probe;
determine, with the at least one processor, an annotation to apply to the ultrasound image based, at least in part, on the determined anatomical feature and the at least one of the determined imaging plane, the determined location of the ultrasound probe, or the determined orientation of the ultrasound probe;
displaying, on a display, the annotation on the ultrasound image;
instructing at least one of (i) removal of the annotation from the display and (ii) cessation of annotation provision to the display, in response to a determination that the ultrasound probe is in motion; and
instructing at least one of (i) return of the annotation to the display and (ii) re-provision to the display, in response to a determination that the ultrasound probe is stationary.

19. The system of claim 1, wherein the instructions, in response to execution on the processor, cause the processor to:
calculate a likelihood that a subsequent annotation is selected based on the annotation determined to be applied to the ultrasound image; and
predict a most likely sequence of annotations.

* * * * *